United States Patent Office 3,462,953
Patented Aug. 26, 1969

3,462,953
GAS TURBINE JET PROPULSION ENGINE
Geoffrey Light Wilde, Cowers Lane, Derbyshire, and Donald Eyre, Alvaston, England, assignors to Rolls-Royce Limited, Derby, England, a British company
Filed Sept. 5, 1967, Ser. No. 665,350
Claims priority, application Great Britain, Sept. 17, 1966, 41,603/66
Int. Cl. F02k 3/12; F02c 3/08
U.S. Cl. 60—226                                              5 Claims

ABSTRACT OF THE DISCLOSURE

A gas turbine jet propulsion engine comprising a gas generator which supplies gases to a turbine, the turbine driving a fan coaxial with and surrounding the gas generator. The turbine has at least one radial flow rotor stage to enable it to take up very little axial space while providing good efficiency.

---

This invention relates to gas turbine jet propulsion engines and has particular but not exclusive reference to lift engines.

A major problem which arises with the use of gas turbine jet propulsion engines, particularly as lift engines, has been the amount of noise produced. This problem has been particularly embarrassing when the use of such engines on civil aircraft has been under consideration since civil aircraft have of necessity to approach within fairly close proximity to cities and other centres of population.

It has been proposed to use gas turbine engines as gas generators to drive fans which provide the majority of the propulsive thrust of the unit. Such fans by virtue of the lower gas velocities involved produce less noise than would a pure jet engine of the same thrust.

However, in order to achieve low gas velocities and hence low noise, the fans and their associated driving turbines must be of large size and this has led to their being of large weight. The present invention provides an engine in which a large fan may be driven by a relatively light turbine arrangement.

According to the present invention a gas turbine jet propulsion engine comprises a gas turbine gas generator, a turbine adapted to be driven by exhaust gases from the generator, and a fan coaxial with the generator and driven by the turbine, the turbine comprising at least one radial flow rotor stage.

Preferably said radial stage or stages comprises the first stage or stages of the turbine, there being at least one further axial flow stage.

Preferably said generator, turbine and fan comprise an integral power unit.

Exhaust gases from the generator may be turned in a volute so as to flow forwardly surrounding the generator for some distance, enabling the turbine to be located so as not to extend axially beyond the generator.

The fan may be carried on bearings in the outer surface of the generator and may be constructed so as not to extend beyond the axial extent of the generator.

The fan may have no guide vanes or supporting structure ahead of the blades.

Figure 1:
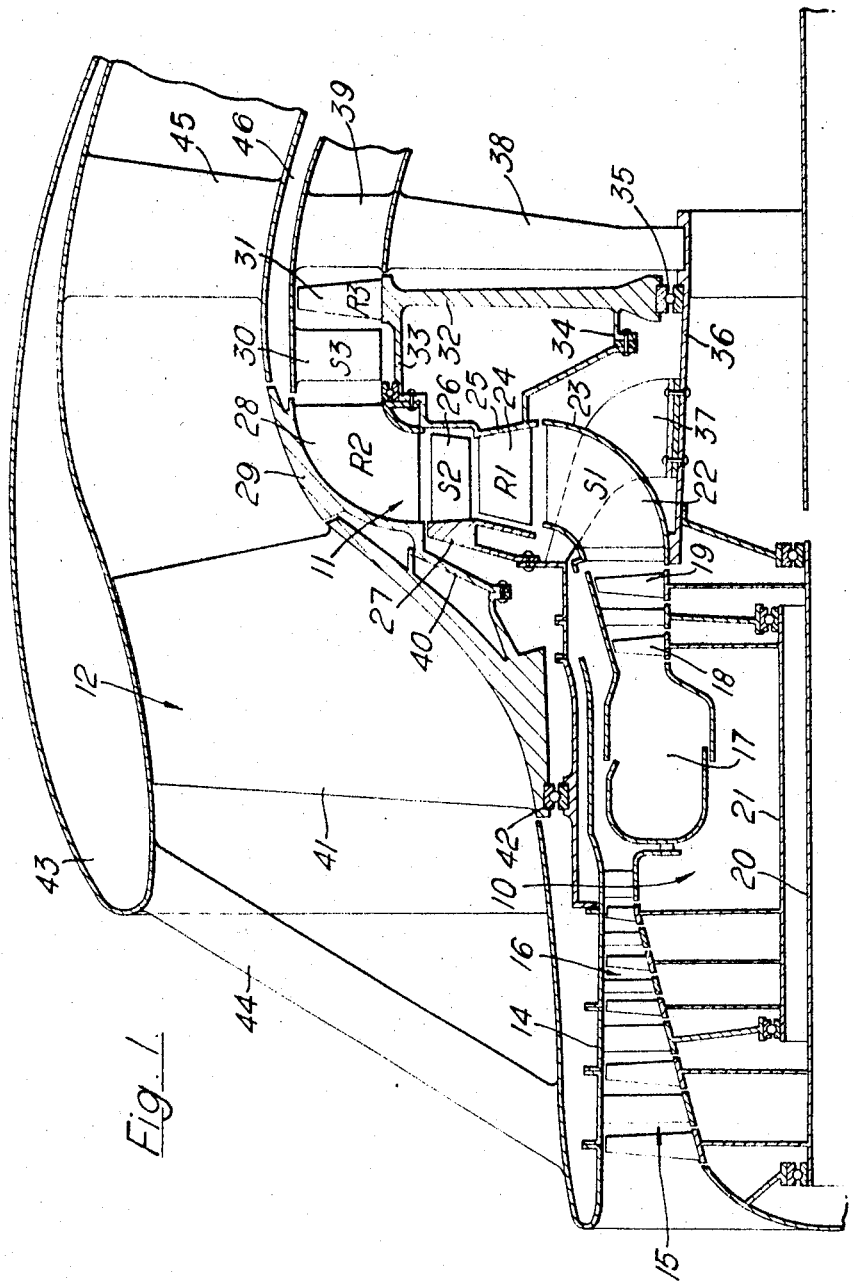
Figure 2:
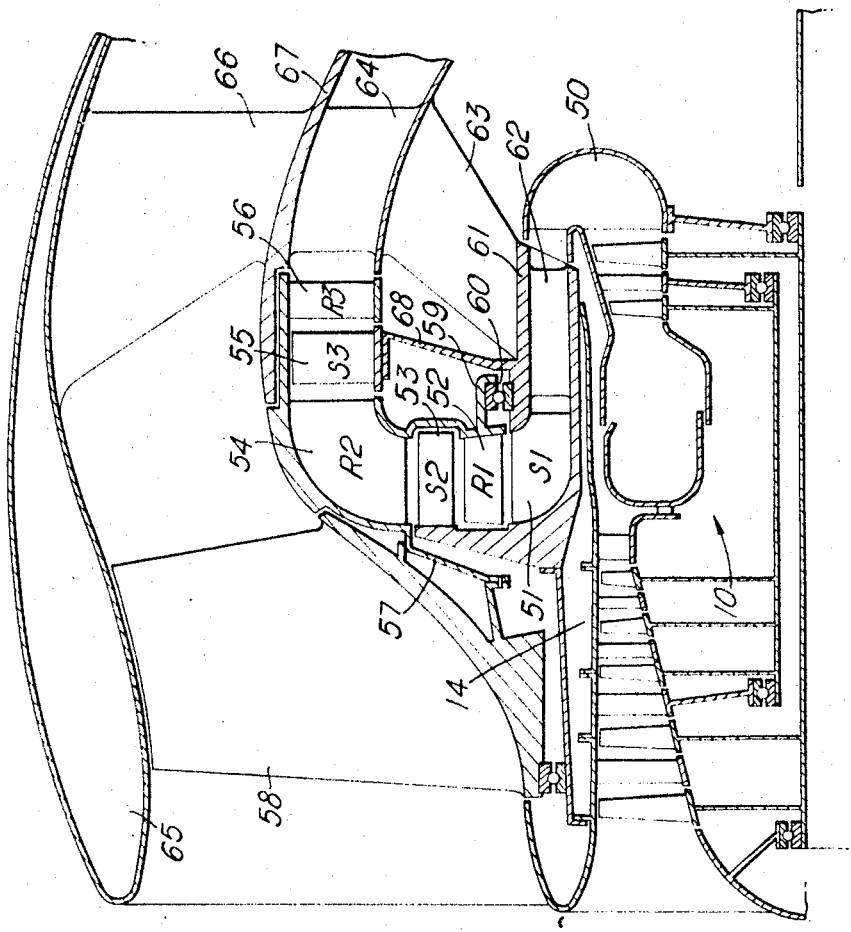
Figure 3:
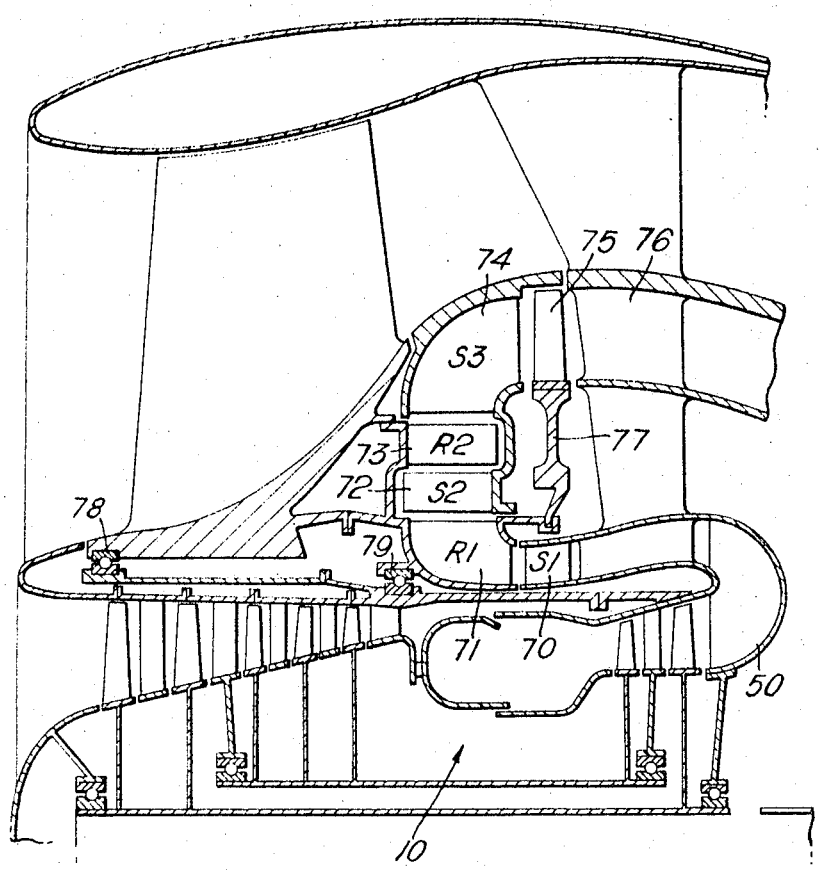

The invention will now be described merely by way of example in which:

FIGURE 1 is a diagrammatic cross-section of one embodiment of the invention;
FIGURE 2 is a view similar to FIGURE 1 of an alternative construction and,
FIGURE 3 is a view similar to the previous figures of a further construction.

In FIGURE 1 there is shown in cross-section a gas turbine jet propulsion engine comprising a gas generator section 10, a turbine section 11 and a fan section 12. The gas generator 10 comprises a casing 14 within which are disposed in flow series a low pressure compressor 15, high pressure compressor 16, combustion section 17, low pressure turbine 18 and high pressure turbine 19. The low pressure compressor 15 and low pressure turbine 19 are drivingly connected by a shaft 20 while the high pressure compressor 16 and high pressure turbine 18 are drivingly connected by a shaft 21.

The construction and operation of the components of the gas generator 10 to produce exhaust gases is conventional and will not be described in detail.

On leaving the low pressure turbine 19 of the gas generator 10 exhaust gases enter the turbine section 11. The gases first pass between stator blades 22 in a volute 23. The volute 23 causes the gas to be turned to flow in a radially outward direction while the stator blades 22 direct the gases on to a row of axially extending aerofoil section rotor blades 24. The blades 24 are attached on their right-hand end as shown in the drawing to a diaphragm structure 25.

Having passed through the rotor blades 24 and imparted some energy to these blades the gases pass through a second row of stator blades 26 which are connected at their left-hand extremities to a ring 27 which is attached to the casing 14 of the gas generator 10. The stators 26 direct the gases on to a second row of rotor blades 28 so that the blades 28 tend to turn in the same direction as the blades 24. The blades 28 form a radial flow stage but also by virtue of having shrouds curved toward the rear of the engine form a volute by means of which the gases are caused to flow in an axially rearward direction.

The blades 28 are connected to the structure 25 and on their outer periphery have a shroud ring 29.

After leaving the blades 28 the gases, now forming an annular flow pass through a row of conventional stator blades 30 and on to a conventional axial flow turbine stage 31. The blades making up the stage 31 are carried from a turbine disc 32 which is connected by a flange 33 and an inner flange 34 to the diaphragm structure 25 producing a hollow annular structure which rotates on a bearing 35 about a fixed tube 36.

In order to mount the tube 36 from a fixed structure a number of arms 37 extend from the casing 14 through the vanes 22 and are attached to the tube 36. The tube 36 is also supported by a number of arms 38 the extremities of which form outlet guide vanes 39 from the turbine section 11.

The three stages of rotors of the turbine are connected by structure 40 which depends from a shroud ring on the rotor blades 28, to a single stage fan comprising a row of fan blades 41. The blades 41 rotate about the bearing 35 and a bearing 42 which surrounds the casing 14 so that the blades rotate coaxially with the gas generator.

A shroud 43 extends annularly round the row of blades 41 and is supported by struts 44 on its upstream periphery from the casing 14 and by struts 45 on its downstream periphery from a shroud ring 46 which carries the stator ring 30 and the ring of vanes 39 and hence the struts 38.

In operation the gas generator takes in air which is compressed in its low pressure and high pressure compressors and is mixed with fuel and ignited in its combustion section. The gases from the combustion section then expand through the turbines 18 and 19 to drive the high pressure and low pressure compressors. Exhaust gases from the generator 10 pass through the turbine section causing the three stages of rotor blades to rotate the fan structure and turbine structure which is supported from the bearings 35 and 42. Thus the fan blades 41 rotate and cause air to be taken in to the inlet formed between the upstream end of the shroud 43 and the casing 14 and to be accelerated and discharged through the outlet formed between the downstream end of the shroud 43 and the downstream end of the shroud 46.

Exhaust gasses from the turbine 11 pass out between the vanes 39 to form an annular hot gas stream.

In FIGURE 2 the gas generator 10 is identical to that of FIGURE 1 and it will therefore not be described.

As in FIGURE 1 exhaust gases pass into a volute 50 but in this case the gases are turned through 180° so that they flow forwardly in an annulus round the casing 14 of the gas generator until they reach a first row of stator vanes 51. Once again the gas is turned in the vanes 51 and then flows radially outward through a stage of rotor blades 52, a second stage of stator blades 53, a second radial flow rotor stage 54 which also forms a volute, a third row of stator blades 58 and an axial flow stage of rotor bades 56. It will be seen that the aerodynamic layout of these stages is identical to that shown in FIGURE 1.

Again structure 57 suports fan blades 58 from the second rotor stage so that the fan blades will rotate with the rotating stages of the turbine.

The bearing arrangement has been changed slightly in that a flange 59 extending rearwardly from a shroud ring on the first row of turbine blades 52 is carried by a bearing 60 from fixed cylindrical structure 61.

The structure 61 is carried by struts 62 from the casing 14 and carries struts 63 which at their radially outer periphery form outlet guide vanes 64 for the hot gas stream from the turbine.

The fan is again surrounded by a shroud 65 but in this case the gas generator 10 does not overhang the leading edge of the shroud 65 and hence the shroud 65 can be supported merely by one row of struts 66 forming extensions of the guide vanes 64, there being a shroud 67 supported between the struts 66 and vanes 64.

The stator vanes 53 are supported in a similar fashion to the vanes 26 of the FIGURE 1 embodiment but in the case of the blades 55 a diaphragm member 68 supports the row of blades from the member 61.

The operation of this embodiment is substantially identical to that described with reference to FIGURE 1 embodiment. However in the present embodiment turning the gases through 180° as soon as they leave the gas generator enables the majority of the turbine section to be disposed within the axial extent of the gas generator thus saving a considerable amount of axial length. This brings attendant advantages in that the shroud 65 can be supported by a single row of struts 66 downstream of the fan blades 58 thus eliminating noise caused by interaction between the fan blades and the wakes of struts disposed upstream of the fan blades.

FIGURE 3 shows a further embodiment which in substantially similar to the FIGURE 2 embodiment. There are certain differences which will be detailed below.

The gas generator section 10 is again identical with that of the FIGURE 1 and as in the FIGURE 2 embodiment the volute 50 turns the gases from the generator through 180°. These gases flow forwardly around the casing of the gas generator and pass through a first row of stator blades 70 which are normal axial flow blades. After passing through the stators 70 the gases impinge on a first rotor stage 71 which takes the place of the stator stage 51 in FIGURE 2. In this stage the gases are diverted outwardly so that they flow in a radial direction. The gases then pass through a radial stator stage 72, a radial rotor stage 73 and a turning stator stage 74 in which the gases are again diverted to flow in an axial direction. After leaving the stator stage 74 the gases pass through a conventional axial flow turbine stage 75 and pass through guide vanes 76 after which they exhaust to atmosphere.

It will be seen that as compared with the FIGURE 2 embodiment the arrangement has been altered so that in the turbine section rotors take the place of stators and vice versa. There are some differences in the mechanical construction; thus the axial turbine stage 75 is supported on a conventional turbine disc 77 which is then connected to the stage 71. The entire rotating assembly of the turbine and fan is again mounted from two bearings 78 and 79, the bearings 78 being positioned similarly to the front bearing in FIGURE 2 while the bearing 79 has been moved from the outside of the flow duct for the reverse gases to inside this duct adjacent the casing of the generator 10. This means that this bearing 79 is of smaller radius than the bearing 60 in FIGURE 2 with attendant simplification.

It will be appreciated that all the described embodiments have had separate streams of air from the fan and from the hot gas exhaust of the turbine section. It would be possible as an alternative to arrange that the gases from the turbine exhaust are mixed with the fan exhaust, for example by causing the hot gas to flow through a member of radially extending fingers having their downstream sides cut away so that the hot gas is introduced to the fan flow in a series of radially extending streams. In this case it would be convenient to have only radial flow stages on the turbine section.

All the embodiments described above with the exception of the last have a series of radial flow turbine stages following by an axial flow stage. This has a basic advantage that the axial flow stage can be arranged to be at a relatively large radius, making it easier to achieve slow fan speeds without gearing while the use of radial flow stages in the flow duct between the axial stage and the generator exhaust enables more power to be taken in what would otherwise be wasted space hence enabling the number of axial flow stages to be reduced to a minimum.

Jet propulsion engines according to the invention can be designed to have a by-pass ratio of 10 to 1 and a single stage fan running at only 800 feet per second tip speed hence producing a relatively low noise level.

It will be noted that the outlets to the fan and hot gas stream have a substantially part-spheircal section. This enables a swivelling thrust deflector nozzle to be used with the engine without any substantial sealing problems.

It might be found that the large "dead" area at the rear of the turbine becomes a source of drag due to a low pressure air region forming there. This could be mitigated by ventilating this space by for instance making the rear set of struts hollow and open to the air at their extremities.

As an alternative form of construction, to the embodiments described, the gas generator could be reversed, so that it takes its air from the fan exhaust. This would avoid the 180° turn of the generator exhaust gases, and could provide advantages in that the generator intake would be protected against ingestion of debris; again the generator could be slightly supercharged. It would however necessitate the exhaust gases from the turbine section being ducted past the flow of intake air for the generator, which could be a problem.

We claim:

1. A gas turbine jet propulsion engine comprising: a gas turbine gas generator; a further turbine; ducting operatively connecting said gas turbine generator to said further turbine for conveying exhaust gases from said gas generator to drive said further turbine; a fan co-axial with said gas generator; a drive connection between said further turbine and said fan whereby said fan may be driven by said further turbine, and in which said further turbine comprises a radial flow stage and at least one axial flow stage.

2. A gas turbine jet propulsion engine as claimed in claim 1 in which said further turbine comprises at least one rotor stage within which the direction of flow is partly radial and partial axial.

3. A gas turbine jet propulsion engine as claimed in claim 1 in which said fan lies within the axial extent of said gas generator, said gas generator carrying bearings on its outer surface for rotatably supporting said fan.

4. A gas turbine jet propulsion engine as claimed in claim 1 and in which said ducting comprises a volute adapted to cause exhaust gases from the generator to flow forwardly surrounding the generator, enabling said further turbine to be located forward of the downstream end of the gas generator.

5. A gas turbine jet propulsion engine comprising: a gas turbine gas generator; a futrher turbine; ducting operatively connecting said gas turbine generator to said further turbine for conveying exhaust gases from said gas generator to drive said further turbine, said ducting comprising a volute for causing exhaust gases from the generator to flow forwardly surrounding the generator and enabling said further turbine to be located forward of the downstream end of the generator; a fan coaxial with said gas generator; a drive connection between said further turbine and said fan whereby said fan may be driven by said further turbine, and in which said further turbine comprises a radial flow stage.

References Cited

UNITED STATES PATENTS

| 2,416,389 | 2/1947 | Heppner | 60—262 |
| 2,526,409 | 10/1950 | Price | 60—226 |
| 2,575,682 | 11/1951 | Price | 60—39.16 |
| 3,253,406 | 5/1966 | Grieb | 60—262 |
| 3,269,120 | 8/1966 | Sabatiuk | 60—226 |
| 3,363,419 | 1/1968 | Wilde | 60—39.16 |

FOREIGN PATENTS 577,017   11/1946   Great Britain.

CARLTON R. CROYLE, Primary Examiner

D. HART, Assistant Examiner

U.S. Cl. X.R.
60—39.16; 230—122